Patented June 4, 1935

2,004,069

UNITED STATES PATENT OFFICE 2,004,069

PROCESS FOR PREPARING ALKYLATED AROMATIC KETONES AND PRODUCT

Herman A. Bruson, Germantown, and Otto Stein, Philadelphia, Pa., assignors to Röhm & Haas Company, Philadelphia, Pa.

No Drawing. Application May 14, 1931, Serial No. 537,496

23 Claims. (Cl. 260—131)

This invention relates to a process for preparing aromatic ketones having an alkyl side chain attached directly to the aromatic nucleus, more especially, to a process for preparing amyl-acetophenone.

The object of this invention is to provide a method by which alkylated aromatic ketones may be more cheaply and readily prepared than by previous methods; and also whereby new and hitherto unknown ketones may be obtained which are useful in the dye, perfume, and other organic industries.

In preparing alkylated aromatic ketones of the type of p-methyl-acetophenone, ethyl-acetophenone, and the like, it has heretofore been the practice to condense toluene, or ethyl benzene respectively, with acetyl chloride (or acetic anhydride) in the presence of catalysts of the Friedel-Crafts type, notably anhydrous aluminum chloride; and after condensation is complete, to decompose the reaction mixture with water or other hydrolytic agent. By using higher homologues of the aromatic hydrocarbons, such as isopropyl-benzene or methyl-isopropyl-benzene, (p-cymene) the corresponding higher alkylated ketones, namely, isopropyl-acetophenone and cymyl-methyl-ketone, respectively, have been obtained.

In all of these processes, the practice has been to condense a suitable alkylated aromatic hydrocarbon with an acyl halide or anhydride of a monobasic carboxylic acid. For brevity, these agents, i. e. acyl halides and anhydrides of monobasic carboxylic acids will hereinafter be referred to generally as "acylating agents" since their function is to introduce the acyl group. More specifically, the term "acylating agent" includes substances of the type of acetic anhydride and its higher homologues such as propionic anhydride, butyric anhydride, etc.; substances of the type of acetyl chloride or bromide or iodide, or higher homologues thereof such as the corresponding propionyl and butyryl halides etc., and substances of the type of benzoyl chloride or benzoic anhydride or homologues and substitution products thereof.

The preparation of alkylated aromatic ketones by the processes used heretofore as desciibed above, involves the preparation of the alkylated aromatic hydrocarbon and its isolation in a sufficient state of purity for the subsequent condensation with the acylating agent. The lower homologues of the series such as toluene, ethyl-benzene, p-cymene, xylene, and isopropyl-benzene are readily available and relatively inexpensive. However, when it is desired to prepare, on a commercial scale, higher alkylated aryl ketones such as butyl-acetophenone

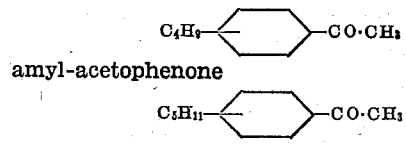

amyl-acetophenone $C_5H_{11}$—⟨ ⟩—CO·CH₃ and the like, the high cost of separately synthesizing the necessary aromatic hydrocarbons (i. e. butylbenzene or amylbenzene) and thereafter condensing them with an acylating agent (in this case, acetyl chloride or acetic anhydride) makes the process prohibitive.

Now we have found that it is unnecessary to prepare, isolate, or use these higher alkylated aromatic hydrocarbons as such, for the above mentioned condensation. We have found that alkylated aryl ketones may readily be prepared in good yield and purity by reacting upon an acylating agent with a mixture of a relatively non-alkylated aromatic hydrocarbon such as benzene and a suitable aliphatic compound capable of reacting therewith to form in situ the desired alkylated aromatic hydrocarbon in the presence of a condensing agent of the Friedel-Crafts type, and thereafter hydrolyzing the reaction product without isolation of any intermediate products.

The aliphatic compounds hereinafter referred to as "alkylating agents" which may be used for the above purpose belong to the group comprising unsaturated aliphatic hydrocarbons containing one double bond, namely the olefines, such as ethylene, propylene, butylene, amylene, hexene, heptene, octene, di-amylene, di-isobutylene and the like; and their hydrohalide addition products (alkyl halides) such as ethyl chloride, propyl chloride, isopropyl bromides, butyl chloride, amyl chloride, etc., or their corresponding bromides or iodides. In place of the pure olefines or alkyl halides, the crude olefines resulting from the cracking of petroleum oils, or their chlorination products may be used for the above purpose, in which case complex mixed alkylated aromatic ketones are obtained.

The condensing agents of the Friedel-Crafts type used are those well known to the art such as the anhydrous halides of aluminum, iron (ferric) tin (stannic) antimony, boron, or mixtures thereof. In the preferred form of the present invention anhydrous aluminum chloride is the most effective and economical condensation catalyst for the reactions herein set forth.

If for example, one wishes to prepare amyl-phenylmethyl-ketone,

by this process, it is not necessary to prepare or use amyl benzene as such and subsequently condense it with acetyl chloride or acetic anhydride as has been customary in the past for preparing the well known lower homologues. Instead, one mixes dry benzene, together with the acylating agent (in this case, acetyl chloride or acetic anhydride) and amylene or an amyl halide (amyl chloride), and anhydrous aluminum chloride in reacting proportions (as described specifically later) and allows reaction to occur under controlled conditions until evolution of hydrogen halide ceases. An inert solvent such as hexane, carbon disulfide, nitrobenzene, acetylene tetrachloride, ethylene dichloride or the like may be present during the condensation in order to allow more effective stirring and to moderate the activity of the reaction. The complex reaction product obtained is then worked up in the usual way by hydroylzing it with water, dilute acid or alkali, and the ketone isolated by methods already known, usually by distillation under reduced pressure.

Since amylene and amyl chloride are now available at a low price, by the chlorination of pentane from natural gas, the present process is an economical one. In the above case, better yields are obtained by the use of amyl chloride than by the use of amylene. Other acylating agents such as propionic anhydride, propionyl chloride and their higher homologues; as well as benzoic anhydride, benzoyl chloride etc., yield the corresponding amyl-phenyl-ethyl ketone, or amyl-benzophenone respectively, and so forth.

The nature of the amyl compounds obtained varies with the conditions and the particular isomer of amylene or of amyl chloride that is used. In general, normal alkyl halides yield secondary alkyl derivatives in the above condensation, and isoalkyl-halides yield tertiary alkyl derivatives. Other isomers may undergo a transposition under the influence of the aluminum chloride to yield mixtures of isomers and degradation products thereof. Due to the complexity of the products formed it is impossible to give the exact nature of the isomers obtained.

In a similar manner butylene or butyl chloride yields butyl phenyl-methyl ketone by reaction with benzene and acetic anhydride or acetyl chloride; octene or sec-octyl chloride yields octyl phenyl-methyl ketone, etc. The monochlorides of the chlorination mixture from petroleum oils or their distillates essentially of aliphatic character, yield still higher alkylated aromatic ketones which consist of mixtures of various ketones.

Instead of benzene, other aromatic hydrocarbons or equivalents thereof, both monocyclic and polycyclic may be used, notably toluene, xylene, cymene, naphthalene, diphenyl, anthracene, phenanthrene and the like. It is herein understood that phenolic ethers, and halogenated or hydrogenated aromatic hydrocarbons are included as equivalents in the above condensations, in which case the corresponding substituted alkylated aromatic ketones are obtained. It is furthermore understood that such aromatic compounds must contain at least two available nuclear hydrogen atoms which are free for condensation.

The crude ketones obtained in this way usually contain in addition to monoalkylated derivatives, varying amounts of di-alkylated and polyalkylated aromatic ketones. Indeed, it is possible by increasing the quantity of olefine or alkyl halide to several times that theoretically required, to introduce more than one alkyl group. Other by-products such as tars and resinous masses are also formed in varying amounts depending upon the conditions. A low reaction temperature and the use of an inert solvent for the condensation mixture favor a smooth reaction.

Under the influence of the condensing agent a "double" Friedel-Crafts type of reaction occurs. One reaction consists in the combination of the aromatic hydrocarbon with the olefine or alkyl halide under the influence of the aluminum chloride to form an alkylated aromatic hydrocarbon-$AlCl_3$ complex in situ. The second reaction consists in the condensation of the acylating agent which is present, with this alkylated aromatic hydrocarbon-$AlCl_3$ complex. The two reactions occur almost simultaneously so that one charge of aluminum chloride suffices for both reactions.

The above procedure may be modified in several ways. For example a mixture of two or more olefines or alkyl salides or acylating agents may be used, whereby two different alkyl or acyl radicles may be introduced in the aromatic nucleus at the same time.

In general, at least one mole $AlCl_3$ or other Friedel-Crafts catalyst is desirable for condensing the olefine or alkyl halide with the aromatic hydrocarbon and at least 2 moles additional $AlCl_3$ for condensing further with the acid anhydride, or one mole additional $AlCl_3$ for condensing with the acyl halide.

It is thus possible and in some cases advantageous to add at first only the quantity of $AlCl_3$ necessary to complete the first phase of the reaction and thereafter to add the remainder of the $AlCl_3$ for the second part of the reaction, varying the temperature from about 5° C. to about 45° C. at the end in order to complete the reaction. The ratio of olefine or alkyl halide, aromatic hydrocarbon, and acylating agent may be 1:1:1 moles but considerably better yields of ketone are obtained by using a ratio of 1⅕:1⅕:1 moles respectively and employing ethylene dichloride as a solvent medium for the condensation. It was to be expected that considerable amounts of anthracene or diphenyl ethane derivatives would be formed by the use of ethylene dichloride in the above condensations but such is not the case.

The reaction may also be carried out by first condensing the aromatic hydrocarbon with the acylating agent using the theoretical quantity of $AlCl_3$ or $FeCl_3$ or mixtures thereof and after the reaction has ceased; to complete the alkylation by adding to the reaction mixture the necessary quantity of olefine or alkyl halide. The process may be carried out also by reversing this order, that is, by condensing the aromatic hydrocarbon with the alkylating agent first. In no case is the intermediate product isolated.

The simplest method and the one which gives the most satisfactory results is to simultaneously react a mixture of all the components together using cooling if necessary, or an inert solvent, to moderate the reaction velocity. With volatile compounds such as ethylene, ethyl chloride, propylene, butylene, and amylene it is best to carry out the reaction by bubbling gas through the reaction mixture using rapid stirring, or in a closed vessel under pressure.

As typical illustrations of the method by which double Friedel-Crafts reactions may be carried out as described above, the following examples are given, it being understood that minor variations in the proportions, temperatures and sequence of steps may be made without seriously affecting the course of the condensations.

*Example 1*

(A) In a vessel resistant to dry hydrogen chloride and equipped with a stirrer, reflux condenser, and charging vent, is placed a mixture of Normal amyl chloride_____ 110 grams
Dry benzene_____ 78 grams
Acetic anhydride__ 102 grams (or 79 gr. acetyl chloride)
Ethylene dichloride. 126 grams (as solvent)

The mixture is stirred and cooled to about 5° C. Anhydrous aluminum chloride, finely powdered, (332 grams) is then gradually added with constant stirring to the mixture during one hour so that the temperature does not exceed 25° C. After stirring for one half hour at 25° C. the temperature is rapidly raised to 40–45° C. and kept thereat until evolution of hydrogen chloride ceases which requires about one hour. The reaction mixture is then cooled down to room temperature, poured on ice and the oily layer removed and washed with a 10% caustic soda solution. The oil is then fractionated, first at atmospheric pressure to remove excess solvent or unreacted materials and finally under a vacuum.

Crude amyl phenyl-methyl ketone comes over as a pale yellow oil boiling at 138–140° C. at 10 m. m. Upon redistillation the pure ketone comes over as a colorless liquid boiling at 121–123° C. at 3 m. m. pressure. The yield is about 60% of the theoretical.

By omitting the ethylene dichloride in the above procedure, the yield is about 30% of theory.

It is believed that the ketone is secondary p-amyl phenyl-methyl ketone,

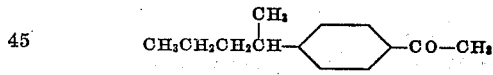

since the ketone obtained by us by condensing secondary amyl benzene with acetic anhydride and AlCl₃ was identical with it in every respect.

(B) By using 92 grams toluene in place of the benzene, the corresponding sec-amyl tolyl-methyl ketone is formed, boiling at 140–160° C./10 m. m. and consisting of at least two isomers which can be separated only with difficulty by distillation.

(C) By using 154 gr. diphenyl, 107 gr. N-amyl chloride, 102 gr. acetic anhydride, and 332 gr. anhydrous AlCl₃ there was obtained acetyl-amyl-diphenyl. It formed a colorless oil boiling at 194–197° C. at 3 m. m. pressure. Considerable acetyl diphenyl was also formed.

(D) By using 108 gr. phenyl-methyl ether, 107 gr. N-amyl chloride, 102 gr. acetic anhydride, and 332 gr. anhydrous AlCl₃ there was obtained acetyl-methoxy-amyl benzene, forming a crystalline mass boiling at 150° C./3 m. m. and having a melting point of 140° C.

*Example 2*

Instead of using normal amyl chloride, as given in Example 1, a mixture of commercial mixed amyl monochlorides such as is obtained by the chlorination of the pentanes of natural gas, was used. This mixture has approximately the following composition:

| | Percent |
|---|---|
| $CH_2Cl\cdot CH_2\cdot CH_2\cdot CH_2\cdot CH_3$ | 24 |
| $CH_3\cdot CHCl\cdot CH_2\cdot CH_2\cdot CH_3$ | 8 |
| $CH_3\cdot CH_2\cdot CHCl\cdot CH_2\cdot CH_3$ | 18 |
| $\begin{array}{c}CH_3\\ \phantom{x}\diagdown\\ \phantom{xx}CH\cdot CH_2\cdot CH_2Cl\\ \phantom{x}\diagup\\ CH_3\end{array}$ | 15 |
| $\begin{array}{c}CH_2Cl\\ \phantom{x}\diagdown\\ \phantom{xx}CH\cdot CH_2\cdot CH_3\\ \phantom{x}\diagup\\ CH_3\end{array}$ | 30 |
| $\begin{array}{c}CH_3\\ \phantom{x}\diagdown\\ \phantom{xx}CCl\cdot CH_2\cdot CH_3\\ \phantom{x}\diagup\\ CH_3\end{array}$ | 5 |

The quantity and method used was that given in Example 1—A. A 56% yield of mixed amyl phenyl-methyl ketones having a boiling point of 133–136° C. at 8 m. m. was obtained as a colorless liquid. Upon refractionation it boiled at 119–120° C. at 3 m. m. pressure.

*Example 3*

The following mixture at 0° C. was gradually treated with 300 grams anhydrous AlCl₃ so that temperature did not exceed 20° C. and worked up as described in Example 1.

Normal butyl chloride_____ 84 grams
Dry benzene____ 70 grams
Acetic anhydride__ 92 grams (or 71 grams acetyl chloride)
Ethylene dichloride_____ 100 ccm.

After decomposing the reaction product with ice and dilute hydrochloric acid, the oil obtained was fractionated. Butyl acetophenone came over at 100–103° C. at 3 m. m. pressure as a colorless oil. It appears to be identical with the butyl acetophenone prepared by condensing sec-butyl benzene with acetic anhydride and AlCl₃ and is therefore very probably sec-butyl acetophenone.

*Example 4*

332 grams anhydrous AlCl₃ were gradually added to the following mixture using the same temperatures and method as given in Example 1.

Isopropyl bromide_____ 123 grams
Dry benzene___ 78 grams
Acetic anhydride__ 102 grams (or 123 gms. acetyl bromide)
Ethylene dichloride_____ 100 ccm.

The yield was 103 gms. isopropyl-acetophenone boiling at 117–123° C./8 m. m. Under refractionating it boiling at 83° C./3 m.m.

*Example 5*

To a mixture of 70 gms. tertiary butyl chloride, 60 gms. dry benzene, 100 gms. propionic anhydride, and 100 ccm. ethylene dichloride were added 253 gms. anhydrous AlCl₃ as described above so that temperature did not exceed 20° C. After working up the reaction product, 71 gms. of tertiary-butyl-propiophenone having a boiling point of 136–146° C./8 m. m. was obtained. Upon refractionation at 3 m. m. pressure it boiled at 100° C.

In a similar manner, by using 47 gms. ter-butyl chloride, 40 gms. benzene, 50 gms. butyryl chloride (or the equivalent quantity of butyric anhydride) and 150 gms. AlCl₃ there is obtained 60 gms. ter-butyl-butyrophenone, as a colorless oil having a boiling point of 114° C./3 m. m.

Example 6

80 gms. commercial amylene having a boiling range of 30–40° C., sp. gr. 0.660 (at 20° C.) and consisting essentially of a mixture of sym-methyl-ethyl ethlylene and tri-methyl-ethylene, was mixed with 130 gm. naphthalene, 200 ccm. ethylene dichloride, 102 gms. acetic anhydride and 300 gms. anhydrous AlCl₃ using the procedure given in Example 1. After decomposing the reaction product with ice and hydrochloric acid, the oil obtained was fractionated. A 30% yield of mixed amyl naphthyl-methyl ketones boiling at 175–180° C./5 m. m. was obtained as a pale yellow oil.

Example 7

Ethylene gas was passed into a rapidly stirred mixture of 78 gms. benzene, 102 gms. acetic anhydride, and 300 gms. anhydrous AlCl₃ at 5–10° C. for 48 hrs. The product of the reaction yielded p-ethyl-acetophenone in addition to acetophenone and diethyl-acetophenone.

Example 8

A mixture of 107 gms. N-amyl chloride, 128 gms. naphthalene and 79 gms. acetyl chloride in 200 ccm. ethylene dichloride was treated at 5–10° C. with 300 gms. anhydrous AlCl₃ while stirring. After warming to 40° C. for ½ hour the product was decomposed with ice and hydrochloric acid. Upon fractionation, the oil yielded amyl-naphthyl-methyl ketone which came over at 180°–190° C./7 m. m. as a pale yellowish oil.

Example 9

A mixture of 55 gms. N-amyl chloride, 39 gms. benzene, and 65 gms. propionic anhydride (or 46.5 gr. propionyl chloride) was treated with 160 gms. anhydrous AlCl₃ at a temperature of 15–20° C. The solidified mass obtained was warmed 1½ hours to 40° C. then decomposed with ice water, washed with alkali, and fractionated. Amyl propiophenone, B. P. 148–152° C./8 m. m. was obtained.

Example 10

107 gms. N-amyl chloride, 78 gms. benzene, and 140 gms. benzoyl chloride (or 226 gms. benzoic anhydride) were treated with 300 gms. anhydrous AlCl₃ as in Example 9. After decomposing the reaction product with water, and fractionating the oil, amylbenzophenone was obtained as a colorless oil, B. P. 187–194° C./7 m. m. Upon refractionation at 3 m. m. it boiled at 153–158° C.

Example 11

To a mixture of 157 gr. bromobenzene, 107 gr. N-amyl chloride, 102 gr. acetic anhydride, 332 gr. anhydrous AlCl₃ was gradually added during 1 hour while mixture was stirred and kept below 20° C. Warmed for 30 minutes at 40–45° C. after reaction had subsided. Worked up as above the mixture yielded amyl bromo-acetophenone boiling at 127–133° C./3 m. m. Some bromo-acetophenone and higher boiling material is likewise formed.

Although, in the preferred form of this invention, anhydrous AlCl₃ has been specified, nevertheless anhydrous AlBr₃, FeCl₃, FeBr₃, SnCl₄, BF₃ and other typical Friedel-Crafts catalysts, or mixtures thereof may be used in any of the condensations. The yields however are not as good as those obtained with AlCl₃.

It is understood that the examples cited are typical of a large number of analogous reactions which can be carried out with aromatic hydrocarbons of the most diverse nature as well as with phenol ethers, and halogenated or hydrogenated aromatic hydrocarbons such as are ordinarily capable of undergoing Friedel-Crafts reactions, so long as they have two or more nuclear positions available for the condensation.

The ketones obtained are all high boiling liquids or waxy materials suitable for use in the resin and varnish industries as paint removers, solvents, plasticizers, lacquer ingredients, and as raw materials for the dyestuff, perfume, and pharmaceutical industries.

In the claims, the term "aromatic compound" is intended to include only those aromatic compounds which are mono or polynuclear hydrocarbons, the halogenated derivatives thereof, aromatic ethers and the corresponding compounds obtained from these by hydrogenation.

What we claim is:

1. The process for preparing mixed amyl-acetophenones which consists in condensing reacting proportions of dry benzene, mixed amyl monochlorides from the chlorination of natural gas pentanes, and acetic anhydride, with anhydrous aluminum chloride; and thereafter hydrolyzing the reaction product.

2. As a new compound, para-amyl-acetophenone having the formula

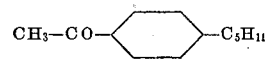

3. As a new composition of matter a mixture of isomeric para-amyl-acetophenones said product being a colorless liquid having a boiling range of about 133–136° C. at 8 m. m. pressure of mercury.

4. In a process for preparing nuclear alkylated ketones, the step comprising condensing an alkylating agent and an acylating agent with an aromatic compound in the same reaction mixture in the presence of a Friedel-Crafts type of catalyst.

5. In a process for preparing nuclear alkylated ketones, the step comprising condensing an alkylating agent and an acylating agent with an aromatic compound in the same reaction mixture, said aromatic compound having at least two nuclear positions available for condensation, in the presence of a Friedel-Crafts type of catalyst.

6. In a process for preparing nuclear alkylated ketones, the step comprising simultaneously condensing an alkylating agent and an acylating agent with an aromatic compound, which has at least two nuclear positions available for condensation, in the presence of a Friedel-Crafts type of catalyst.

7. In a process for preparing nuclear alkylated ketones, the step comprising condensing an alkylating agent and an acylating agent with an aromatic compound in the same reaction mixture, said aromatic compound having at least two nuclear positions available for condensation, in the presence of anhydrous aluminum chloride.

8. In a process for preparing nuclear alkylated ketones, the step which comprises simultaneously condensing an alkyl halide and an acylating agent with an aromatic compound, which has at least two nuclear positions available for condensation, in the presence of anhydrous aluminum chloride.

9. In a process for preparing nuclear alkylated ketones, the step which comprises simultaneously condensing a monochlorinated paraffinic hydrocarbon and an acylating agent with an aromatic compound, which has at least two nuclear positions available for condensation, in the presence of anhydrous aluminum chloride.

10. In a process for preparing nuclear alkylated ketones, the step which comprises simultaneously condensing a monochlorinated paraffinic hydrocarbon and an acyl halide with an aromatic compound, which has at least two nuclear positions available for condensation, in the presence of anhydrous aluminum chloride.

11. In a process for preparing nuclear alkylated ketones, the step which comprises simultaneously condensing a monochlorinated paraffinic hydrocarbon and a monocarboxylic acid chloride with an aromatic compound, which has at least two nuclear positions available for condensation, in the presence of anhydrous aluminum chloride.

12. In a process for preparing nuclear alkylated ketones, the step which comprises simultaneously condensing a monochlorinated paraffinic hydrocarbon and acetyl chloride with an aromatic compound, which has at least two nuclear positions available for condensation, in the presence of anhydrous aluminum chloride.

13. In a process for preparing nuclear alkylated ketones, the step which comprises simultaneously condensing a monochlorinated paraffinic hydrocarbon and a monocarboxylic acid anhydride with an aromatic compound, which has at least two nuclear positions available for condensation, in the presence of anhydrous aluminum chloride.

14. In a process for preparing nuclear alkylated ketones, the step which comprises simultaneously condensing a monochlorinated paraffinic hydrocarbon and acetic anhydride with an aromatic compound, which has at least two nuclear positions available for condensation, in the presence of anhydrous aluminum chloride.

15. In a process for preparing nuclear alkylated ketones, the step which comprises simultaneously condensing an olefine hydrocarbon and an acylating agent with an aromatic compound, which has at least two nuclear positions available for condensation, in the presence of anhydrous aluminum chloride.

16. In a process for preparing nuclear alkylated ketones, the step which comprises simultaneously condensing an olefine hydrocarbon and an acyl halide with an aromatic compound, which has at least two nuclear positions available for condensation, in the presence of anhydrous aluminum chloride.

17. In a process for preparing nuclear alkylated ketones, the step which comprises simultaneously condensing an olefine hydrocarbon and a monocarboxylic acid chloride with an aromatic compound, which has at least two nuclear positions available for condensation, in the presence of anhydrous aluminum chloride.

18. In a process for preparing nuclear alkylated ketones, the step which comprises simultaneously condensing an olefine hydrocarbon and acetyl chloride with an aromatic compound, which has at least two nuclear positions available for condensation, in the presence of anhydrous aluminum chloride.

19. In a process for preparing nuclear alkylated ketones, the step which comprises simultaneously condensing an olefine hydrocarbon and a monocarboxylic acid anhydride with an aromatic compound, which has at least two nuclear positions available for condensation, in the presence of anhydrous aluminum chloride.

20. In a process for preparing nuclear alkylated ketones, the step which comprises simultaneously condensing an olefine hydrocarbon and acetic anhydride with an aromatic compound, which has at least two nuclear positions available for condensation, in the presence of anhydrous aluminum chloride.

21. The process for preparing nuclear alkylated ketones which comprises condensing an alkylating agent and an acylating agent successively in the same reaction mixture with an aromatic compound in the presence of a Friedel-Crafts type of catalyst.

22. The process for preparing nuclear alkylated ketones which comprises condensing an alkylating agent and an acylating agent successively in the same reaction mixture with an aromatic compound which has at lest two nuclear positions available for condensation, in the presence of a Friedel-Crafts type of catalyst.

23. The process for preparing nuclear alkylated ketones which comprises condensing an alkylating agent and an acylating agent successively in the same reaction mixture with an aromatic compound which has at least two nuclear positions available for condensation, in the presence of anhydrous aluminum chloride.

HERMAN A. BRUSON.
OTTO STEIN.